United States Patent [19]

Schuessler

[11] Patent Number: 5,864,831
[45] Date of Patent: Jan. 26, 1999

[54] DEVICE FOR DETERMINING ROAD TOLLS

[75] Inventor: Robert Schuessler, Stuttgart, Germany

[73] Assignee: Daimler Benz AG, Germany

[21] Appl. No.: 197,594

[22] Filed: Feb. 17, 1994

[30] Foreign Application Priority Data

Feb. 17, 1993 [DE] Germany .......................... 43 04 838.2

[51] Int. Cl.[6] .................................................. G07B 15/02
[52] U.S. Cl. .......................... 705/417; 705/13; 705/400
[58] Field of Search ........................... 340/928; 364/401, 364/467, 464.01; 705/13, 400, 417, 418

[56] References Cited

U.S. PATENT DOCUMENTS

| | | | |
|---|---|---|---|
| 2,796,165 | 10/1957 | Bower | 340/928 X |
| 2,908,895 | 10/1959 | Cooper | 340/928 X |
| 2,989,736 | 6/1961 | Cooper | 340/928 X |
| 3,024,991 | 3/1962 | Foote | 364/401 |
| 3,057,422 | 10/1962 | Cunningham et al. | 364/467 X |
| 3,070,293 | 12/1962 | Rosapepe | 340/928 X |
| 3,090,941 | 5/1963 | Breese | 340/928 |
| 3,104,367 | 9/1963 | Grant | 340/928 |
| 3,109,926 | 11/1963 | Bolton | 364/467 X |
| 3,164,677 | 1/1965 | Morris et al. | 364/467 X |
| 3,212,615 | 10/1965 | Hellar, Jr. | 364/467 X |
| 3,231,854 | 1/1966 | Gran | 340/928 |
| 3,257,650 | 6/1966 | Beaven | 340/928 X |
| 3,317,892 | 5/1967 | Schwarz | 340/928 |
| 3,602,881 | 8/1971 | Bayne et al. | 340/928 |
| 3,705,976 | 12/1972 | Platzman | 340/928 X |
| 3,713,148 | 1/1973 | Cardullo et al. | 342/42 |
| 3,794,966 | 2/1974 | Platzman | 340/928 |
| 4,256,128 | 3/1981 | Chiappetti | 194/215 |
| 4,258,502 | 3/1981 | St. Cyr | 49/49 |
| 4,338,587 | 7/1982 | Chiappetti | 340/928 |
| 4,555,618 | 11/1985 | Riskin | 235/384 |
| 4,652,729 | 3/1987 | Kubota et al. | 235/384 |
| 4,675,676 | 6/1987 | Takanabe et al. | 340/995 |
| 4,675,824 | 6/1987 | Kiyama et al. | 364/464.01 |
| 4,682,170 | 7/1987 | Kubota et al. | 340/928 |
| 4,963,723 | 10/1990 | Masada | 235/384 |
| 4,970,389 | 11/1990 | Danforth et al. | 250/271 |
| 5,086,389 | 2/1992 | Hassett et al. | 364/401 |
| 5,101,200 | 3/1992 | Swett | 340/928 X |
| 5,144,553 | 9/1992 | Hassett et al. | 364/401 |
| 5,204,675 | 4/1993 | Sekine | 340/928 X |
| 5,266,785 | 11/1993 | Sugihara et al. | 235/384 |
| 5,694,322 | 12/1997 | Westerlage et al. | 705/417 |
| 5,721,678 | 2/1998 | Widl | 701/35 |

FOREIGN PATENT DOCUMENTS

| | | |
|---|---|---|
| 0 387 474 | 9/1990 | European Pat. Off. . |
| 25 12 954 | 9/1975 | Germany . |
| 35 25 671 | 12/1986 | Germany . |
| 38 30 643 | 3/1989 | Germany . |
| 38 05 810 | 9/1989 | Germany . |
| 40 05 803 | 8/1990 | Germany . |
| 4033527 | 4/1991 | Germany . |
| 40 23 110 | 1/1992 | Germany . |
| 41 30 367 | 3/1992 | Germany . |
| 40 39 887 | 6/1992 | Germany . |
| 41 12 472 | 10/1992 | Germany . |
| 92/08210 | 5/1992 | WIPO . |
| 92/10824 | 6/1992 | WIPO . |

OTHER PUBLICATIONS

"Intelligent Vehicle Highway System –The Universal Close–Range Road/Vehicle Communication System Concept –The EnhancedAVI and Its CVO Applications," R. Sabounghi, Vehicle Navigation & Information Systems Conference Proceedings, Part 2, Oct. 1991, pp. 957–967.

Primary Examiner—Edward R. Cosimano
Attorney, Agent, or Firm—Evenson, McKeown, Edwards & Lenahan, P.L.L.C.

[57] ABSTRACT

A device, for determining road tolls having a road storage unit in which, in addition to a road network, parameters are electronically stored which represent a proportional toll due for each route section of the road network. A device for determining the vehicle position is provided, as well as a computer unit which determines the toll for a vehicle travelling over a particular route as least in dependence on the parameter and position data. An adaptation to changing tolls is possible in a simple matter with this device by storing new or further parameters influencing the toll.

11 Claims, 1 Drawing Sheet

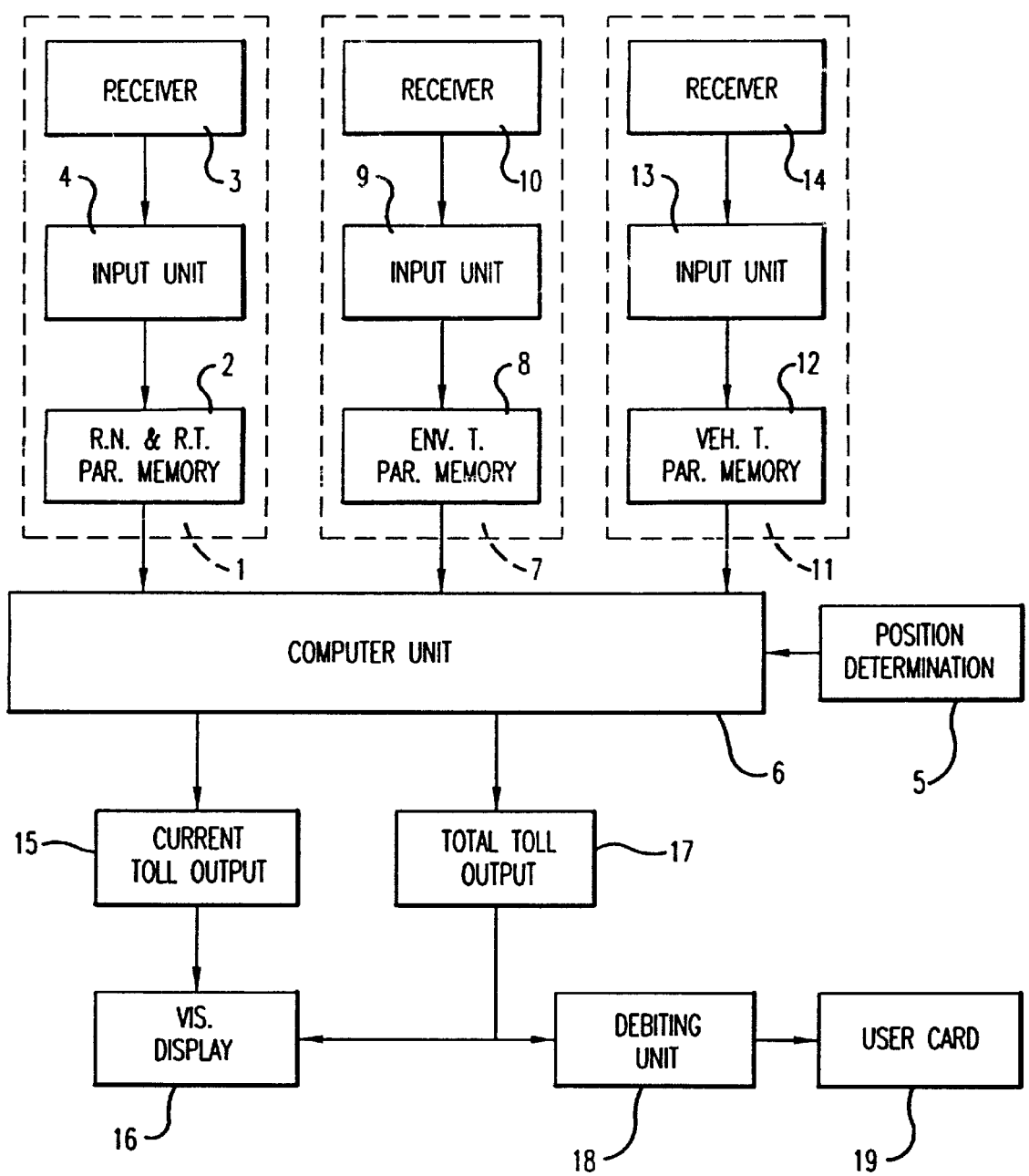

DEVICE FOR DETERMINING ROAD TOLLS

BACKGROUND AND SUMMARY OF THE INVENTION

The present invention relates to a device for determining the toll for a vehicle travelling over a route section.

Systems for collecting such a toll are recently becoming more important, particularly for cars travelling on roads. In some countries, a "vignette" system is used, for example for highways, which provides for the charging of a fixed annual amount independently of the degree of usage. In contrast, in the so-called "Maut" system, which is used, in particular, for expensive highway sections, for example roads through mountain passes or tunnels, a fee is only charged for the actual use in each case.

Known Maut systems in which the road toll is only charged usage-dependently for travelling on the chargeable road section require roadside facilities as system components. Thus, a Maut system disclosed in German Patent Document 38 30 643 A1 contains a roadside base station with computer unit and suitable barrier arrangements at the Maut boundaries.

Roadside detector devices within a Maut section of a particular length are also provided in the Maut system known from German Patent Document 41 12 472 A1. In addition to those detectors used for location detection at the Maut boundaries, a number of other detectors are used there for detecting the respective vehicle speed, significant deviations from a reference speed value leading to an increase in the Maut toll.

Another Maut system in which a vehicle-borne station and a base station installed at the roadside exchange coded information for Maut toll charging purposes is mentioned in German Patent Document 40 39 887 A1. In this system, a first roadside transmitter which is mounted, for example, on a beacon, is provided which, after the entry of the vehicle into the Maut zone has been detected, transmits signals to the vehicle station which determine the amount of Maut toll. A second roadside transmitter which is mounted, for example, on another beacon receives an acknowledgement message from the vehicle station and checks that the toll has been paid.

Because of the necessity of barrier facilities at the Maut boundaries, the known Maut systems are mainly suitable for charging a road toll for sufficiently closed road sections in which it is not possible to bypass the detector or pay stations at the Maut boundaries. When there are many branches in the section, this becomes correspondingly expensive since a correspondingly large number of roadside facilities is required.

Taxi meters such as are used, for example, in taxis, are known for determining a distance-dependent fee for using a vehicle. Such taxi meters which primarily determine the fare in dependence on the distance travelled and possible waiting times are described for example, in German Patent Document 40 23 110 A1 and German Patent Document 25 12 954 C3. Taxi meters as such are not suitable for determining a road toll since they do not register the variables primarily influencing this toll such as, for example, the type of road used.

From European Patent 0 387 474 A2, it is known to have the fare determined by a taxi meter debited from a user-owned credit card.

The prior art also includes vehicle-borne facilities for determining the position of the vehicle with the aid of satellite signals, see, for example, German Patent Document 41 30 367 A1. To be able to reproduce the position of the vehicle within a road map which can be visibly displayed in the vehicle, it is known from German Patent Document 40 33 527 A1 to combine such a vehicle position detector with an electronically stored road map, by means of which an evaluating unit determines the vehicle position on the road map by means of comparison of the respective data.

An object of the present invention is to provide a device for determining the accrued toll for a vehicle travelling over a route section, by means of which it is possible to determine the toll vehicle-autonomously without stationary roadside facilities and for any road sections of a road network travelled on.

This and other objects are achieved by the present invention which provides a device for determining a toll for a vehicle travelling over a road section, comprising vehicle-carried means for determining the position of the vehicle, and a vehicle-carried road storage device in which data of at least one entire toll-chargeable road network with associated road toll parameters are electronically stored, an individual road toll parameter being associated with a particular road section of the road network and representing a proportional road toll due for the use of this section. A vehicle-carried computer unit is connected to the road storage device and the means for determining the position. The computer unit determines the toll due for the use of the route sections travelled by the vehicle at least from the data of the means determining the position and the road storage device.

Each chargeable road section of a total road network stored in a vehicle-borne electronic storage device is associated with a section toll parameter which represents the proportional toll due for this section. The present invention allows the toll to be determined for the case of a general charge for the entire road network accessible to a vehicle which is then stored as a whole together with the associated road toll parameters. It also allows for cases of only partial charging, for example only for motorways, expensive road sections or roads located within particular country or city boundaries. In such cases, the present invention makes it possible to store only the chargeable roads in the road network together with the associated road toll parameters, or to store a larger network, for example the entire accessible road network and to allocate the road toll parameter value for a toll of "zero" to the non-chargeable road sections.

Corresponding to the density of the stored road network, the means for determining the position of the vehicle have an adequate local resolution which allows an unambiguous correlation of the road section travelled with the individual, possibly directly adjacent road sections of the stored road network. Depending on the accuracy required, the use of a satellite-based position determining system and/or other vehicle-carried devices such as, for example, wheel tachometers, direction sensors or digital maps, is provided for this purpose.

In an embodiment of the invention, the stored data of the road network and/or the road toll parameters can be updated in that the new data are received by a receiver unit, for example a radio or mobile radio receiver and are newly stored in the memory of the storage device via an input unit. This allows flexible adaptation of the system to changing tolls for the respective road sections.

In another embodiment of the invention, a storage device is arranged in which environmental toll parameters are stored which influence the toll, in addition to the road toll parameters, in dependence on the surrounding vehicle situation such as, for example, the traffic density or the pollution level. The data for the time-dependent environmental toll parameters are preferably overwritable, for which purpose the memory is preceded by a receiver unit and an input unit.

In another embodiment of the invention, a storage device is provided in which vehicle- and/or trip-specific toll parameters also influencing the toll are stored such as, for example, the loading, the travelling speed or the axle load. For the registration and possible updating of these vehicle toll parameters, the memory is preferably preceded by suitable sensors and an input unit for writing into the memory data obtained by the sensors or otherwise input.

In certain embodiments, the computer unit determines an instantaneous road toll for the road section currently travelled from the data extracted from the memories and the signals of the position determining means and reproduces this toll on a visual display device.

In certain embodiments of the invention, the computer unit adds together the proportional tolls previously accrued from a starting point to form a total toll and outputs them on a visual display unit and/or supplies this value for the total toll to a debiting unit into which a user card can be inserted from which the toll is automatically debited.

Other objects, advantages and novel features of the present invention will become apparent from the following detailed description of the invention when considered in conjunction with the accompanying drawings.

BRIEF DESCRIPTION OF THE DRAWING

The single drawing FIGURE illustrates in block diagram form an embodiment of the present invention.

DETAILED DESCRIPTION OF THE DRAWING

The single drawing FIGURE shows a device for determining the toll for a vehicle travelling over a particular route section. The entire device with its electrically interconnected components is located inside the vehicle, not shown. It has a computer unit (6) and a unit (5), connected thereto, for determining the position of the vehicle. For this purpose, the position determination system can be a conventional satellite-based system and/or other vehicle-borne position determining system such as, for example, wheel tachometers, direction sensors or digital maps.

The computer unit (6) is also connected to a road storage device (1), an environmental toll parameter storage device (7) and a vehicle toll parameter storage device (11).

The road storage device (1) contains an erasable memory (2) in which data of a road network and toll parameters belonging to respective road sections of this network are stored. The toll parameters represent the proportional toll provided for the respective road sections. The memory (2) is preceded by a receiver unit (3) connected to an input unit (4). In this manner, changes in the amount of toll for the respective road sections can be taken into consideration in that the data representing the changes are transmitted, for example from a central station, to the receiver unit (3). The changes are then forwarded to the input unit (4) which, in turn, newly writes the data into the memory (2) and, if necessary, deletes outdated data. In the same manner, the road network stored in the memory (2) is changed, if required. A radio or a mobile radio receiver, for example, can be used as the receiver unit (3).

The environmental toll parameter storage device (7) contains an erasable memory (8) in which data of parameters characteristic of the current travelling environment and also influencing the amount of toll, such as, for example, the current traffic density and/or the existing pollution level are stored. Analogously to the road storage device (1), the environmental toll parameter storage device (7) exhibits, preceding its memory (8), a receiver unit (10) and an input unit (9). The environmental toll parameter storage device (7) receives new environmental toll parameter data, if necessary, via the receiver unit (10) and stores these data by means of the input unit (9) in the memory (8) connected thereto, overwriting the previous data.

The vehicle toll parameter storage device (11) contains an erasable memory (12) in which data of vehicle-and/or trip-specific parameters also influencing the amount of toll such as, for example, the vehicle type, the loading, the travelling speed or the axle load are stored. The memory (12) is preceded by sensors (14) and an input unit (13) which is acted upon by the sensors (14). This makes it again possible to overwrite the data stored in the memory (12) with new current data. If the vehicle toll parameters are physical measurement quantities (for example loading and travelling speed), these are detected by the sensor (14) and the associated signals are supplied to the input unit (13). Data of other vehicle-specific variable such as, for example, the vehicle type, can also be supplied to the input unit (13), if necessary directly, for example, by means of a keyboard.

The contents of the memories (2, 8, 12) can be read out by the computer unit (6). These data, and those of the position determining unit (5), are used by the computer unit (6) to determine the currently due road toll in accordance with a program set up for this purpose. The program for determining the road toll due from the supplied data is well within the skill of one of ordinary skill in the art. This value is reproduced via a preferably integrated output unit (15) on a connected visual display unit (16) which can be, for example, an illuminated digital display, a paper strip or the like.

At the same time, the computer unit (6) determines the total road toll accrued overall from a particular starting point by adding together the current toll values, and outputs this value via an output unit (17) that can be an integrated unit. The output unit (17) forwards this toll value both to the visual display unit (16) connected to it for corresponding visual reproduction and also to a connected debiting unit (18). A user card (19) can be inserted into this debiting unit (18) by means of which the due toll is automatically debited. The user card (19) can be an electronic value card similar to a telephone card which is procured by the user in advance for a particular amount and from which the debiting unit (18) deducts the respective toll. As an alternative, it is possible to provide a manner of payment at the end of a period, in such a manner that a credit card is used as the user card (19), the debiting unit (18) reading the user account stored thereon and debiting this account.

The device for determining the accrued road toll described does not require any roadside facilities but operates completely vehicle-autonomous as an electronic data processing system. It also allows a very flexible adaptation to changing road networks and/or tolls and makes it possible in a simple manner to take into consideration a multiplicity of different toll-influencing variables. It can be used in land- air- and seacraft.

Modifications of the embodiment shown and described are possible for the expert. Thus, in certain embodiments, additional facilities or measures are provided for protecting against misuse or manipulation and for dealing with exceptional situations when, for example, the position determination is unsuccessful or faulty or when a value card inserted no longer contains an adequate value amount. The electronic units shown individually in the block diagram can be at least partially implemented in a common chip. Thus, it is possible to combine the memories (2, 8, 12) to form a single memory which, if needed, can also be integrated in the computer unit (6). In addition, the computer unit (6) can be used as the control unit for controlling the electronic chips shown and any other electronic chips of the vehicle, without this being shown explicitly in the FIGURE.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Device for determining a toll for a vehicle travelling over a road section, comprising:

vehicle-carried means for determining the position of the vehicle, and a vehicle-carried road storage device in which data of at least one toll-chargeable road network are electronically stored, said road storage device also having stored therein road toll parameters associated with said toll chargeable road network, an individual road toll parameter being associated with a particular road section of the road network and representing a proportional road toll due for the use of this section, and a vehicle-carried computer unit connected to the road storage device and the means for determining the position, the computer unit determining the toll due for the use of the route sections travelled by the vehicle, based at least on data from the means for determining the position, and road network and toll parameter data from the road storage device.

2. Device according to claim 1, wherein the road storage device includes an erasable memory, a receiver unit for receiving updated data of the road network and the road toll parameters and an input unit, coupled to the receiver unit and the road storage device, for writing received updated data into the memory.

3. Device according to claim 1, further comprising a an output unit coupled to the computer unit and a display unit coupled to the computer unit, wherein the computer unit determines the value of a currently accrued toll and outputs the value via the output unit to the visual display unit.

4. Device according to claim 1, further comprising a storage device, connected to the computer unit, for electronic storage of data of environmental toll parameters which represent a proportional toll dependent on a current environmental situation of the vehicle, the environmental toll parameters being taken into consideration by the computer unit in the determination of the toll.

5. Device according to claim 4, wherein the environmental toll parameter storage device contains an erasable memory, a receiver unit for receiving updated environmental toll parameter data and an input unit, coupled to the memory and the receiver unit, for writing received updated environmental toll parameter data into the memory.

6. Device according to claim 1, further comprising a storage unit, connected to the computer unit, for the electronic storage of data of vehicle-related toll parameters which represent a vehicle-related proportional toll which is taken into consideration by the computer unit during the determination of the toll.

7. Device according to claim 6, wherein the vehicle toll parameter storage device contains an erasable memory, means for registering the values of the vehicle toll parameters and an input unit, coupled to the memory and means for registering, for writing output data of the means for registering into the memory.

8. Device according to claim 1, further comprising an output unit coupled to the computer unit, wherein the computer unit determines the value of the total toll accrued during a trip and outputs the value via the output unit.

9. Device according to claim 8, further comprising a debiting unit coupled to the output unit, wherein an output signal of the output unit for the total toll is supplied to the debiting unit, the debiting unit having means for receiving input from a user card for debiting the toll.

10. Device according to claim 8, further comprising a visual display unit coupled to the output unit, wherein an output signal of the output unit for the total toll is supplied to the visual display unit.

11. Device according to claim 10, further comprising a debiting unit coupled to the output unit, wherein the output signal of the output unit for the total toll is supplied to the debiting unit, the debiting unit having means for receiving input from a user card for debiting the toll.

* * * * *